United States Patent [19]

Willcox

[11] Patent Number: 5,238,980
[45] Date of Patent: Aug. 24, 1993

[54] CORROSION INHIBITION OF STEREOREGULAR, BRANCHED-MONO-1-OLEFIN POLYMERS

[75] Inventor: Kenneth W. Willcox, Bartlesville, Okla.

[73] Assignee: Phillips Petroleum Company, Bartlesville, Okla.

[21] Appl. No.: 992,299

[22] Filed: Dec. 17, 1992

Related U.S. Application Data

[63] Continuation-in-part of Ser. No. 960,321, Oct. 13, 1992.

[51] Int. Cl.$^5$ .............................................. C08L 23/20
[52] U.S. Cl. .................................... 524/101; 524/392; 524/502; 524/579; 422/7; 252/391; 252/402
[58] Field of Search ............... 524/101, 392, 502, 579; 422/7; 252/391, 402

[56] References Cited

U.S. PATENT DOCUMENTS

| | | | |
|---|---|---|---|
| 3,258,449 | 6/1966 | Heuck et al. | 260/45.95 |
| 3,549,587 | 12/1970 | Nicholson et al. | 260/45.8 |
| 4,793,972 | 12/1988 | Willcox | 422/7 |
| 4,927,930 | 5/1990 | Cantatore et al. | 544/8 |
| 5,059,689 | 10/1991 | Rody et al. | 544/6 |
| 5,066,460 | 11/1991 | Willcox | 422/7 |
| 5,158,992 | 10/1992 | Caselli et al. | 523/207 |

*Primary Examiner*—Joseph L. Schofer
*Assistant Examiner*—Mark Nagumo
*Attorney, Agent, or Firm*—Carl D. Corvin

[57] ABSTRACT

A stereoregular, branched-mono-1olefin polymer composition that has reduced corrosion tendencies is provided. This polymer composition comprises:
(a) a stereoregular, branched-mono-1-olefin polymer;
(b) tris(3,5-di-t-butyl-40hydroxybenzyl)isocyanurate;
(c) poly[[6-[(1,1,3,3-tetramethylbutyl)amino]-s-triazine-2,-4-diyl][(2,2,6,6-tetramethyl-4-piperidyl)imino]hexamethylene-[(2,2,6,6-tetramethyl-4-piperidyl)imino]]; and
(d) a hydrocarbylsulfide.

14 Claims, No Drawings

CORROSION INHIBITION OF STEREOREGULAR, BRANCHED-MONO-1-OLEFIN POLYMERS

CROSS-REFERENCE TO RELATED APPLICATION

This application is a continuation-in-part of application Ser. No. 07/960,321 which was filed Oct. 13, 1992, the entire disclosure of which is hereby incorporated by reference.

BACKGROUND OF THE INVENTION

This invention is related to the field of stereoregular, branched-mono-1-olefin polymers.

Stereoregular, branched-mono-1-olefin polymers (hereafter "SBM polymers") tend to promote the corrosion of metal surfaces with which they come into contact. This problem is especially acute during the processing of these SBM polymers into useful items. For example, when a poly(4-methyl-1-pentene) resin is chain-scissioned in an extruder to produce a poly(4-methyl-1-pentene) resin with a lower molecular weight, the metal surfaces that the poly(4-methyl-1-pentene) resin comes in contact with could be subject to excessive corrosion, thereby necessitating additional maintenance on, or in the extreme replace of, the extruder. Therefore, reducing the corrosive effects of these SBM polymers would be of scientific and economic value.

SUMMARY OF THE INVENTION

It is an object of this invention to provide a SBM polymer composition having reduced corrosive effect on other materials with which it comes in contact.

It is another object of this invention to provide a polymethylpentene homopolymer or copolymer composition having reduced corrosive effect on other materials with which it comes in contact. corrosion tendencies.

In accordance with this invention a SBM polymer composition having reduced corrosive effect on other materials with which it comes in contact is provided. This composition comprises (or optionally consists essentially of, or consists of):

(a) a stereoregular, branched-mono-1-olefin polymer;
(b) tris(3,5-di-t-butyl-4-hydroxybenzyl)isocyanurate;
(c) poly[[6-[(1,1,3,3-tetramethylbutyl)amino]-s-triazine-2,4-diyl][(2,2,6,6-tetramethyl-4-piperidyl)imino]hexamethylene-[(2,2,6,6-tetramethyl-4-piperidyl)imino]]; and
(d) a hydrocarbylsulfide.

DETAILED DESCRIPTION OF THE INVENTION

The SBM polymers that can be used in this invention are those polymers that have been formed by the polymerization of branched mono-1-olefins. These branched-mono-1-olefins have the following formula:

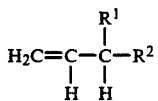

wherein $R^1$ is hydrogen or a $C_nH_{(2n+1)}$ alkyl, where n is an integer from 1 to about 4; and wherein $R^2$ is a $C_xH_{(2x+1)}$ alkyl, where x is an integer from 1 to about 6; provided that when $R^1$ is hydrogen then $R^2$ is a branched alkyl. Examples of branched-mono-1-olefins useful in this invention are: 3-methyl-1-butene; 3-methyl-1-pentene; 4-methyl-1-pentene; and 3-ethyl-1-hexene. These branched-mono-1-olefins can be polymerized by any method in the art to produce the SBM polymers useful in this invention. Each of the branched mono-1-olefins could be polymerized alone to form a SBM homopolymer, or it could be polymerized with any of the other branched mono-1-olefins to form a SBM copolymer. Additionally, a branched-mono-1-olefin could be polymerized with linear monomers such as ethylene, propylene, 1-butene, 1-pentene, 1-hexene, or mixtures thereof, to form a SBM-monomer copolymer. However, it is believed that the major portion of this SBM-monomer copolymer should be a branched-mono-1-olefin in order to retain the benefits of this invention. The term "major portion" for the purposes of this specification means greater than 50 mole percent based on the total number of moles of branched-mono-1-olefin and linear monomer present in the SBM-monomer copolymer.

Tris(3,5-di-t-butyl-4-hydroxybenzyl)isocyanurate is also known as 1,3,5-tris(3,5-di-t-butyl-4-hydroxybenzyl)-s-iriazine-2,4,6 (1H,1H,5H)trione. This chemical is available from commercial sources. For example, it is available from the Ciba-Geigy Corporation under the tradename Irganox 3114. In accordance with the invention the amount of this component used in the SBM polymer composition is from about 0.001 to about 1 weight percent where the weight percent is based on the weight of the SBM polymer. However, it is preferred that the amount used is from about 0.01 to about 0.8 weight percent; it is more preferred that the amount used is from about 0.05 to about 0.5 weight percent; and it is most preferred that the amount used is from 0.1 to 0.3 weight percent.

Poly[[6-[(1,1,3,3-tetramethylbutyl)amino]-s-triazine-2,4-diyl][(2,2,6,6-tetramethyl-4-piperidyl)imino]hexamethylene-[(2,2,6,6-tetramethyl-4-piperidyl)imino]] is also available from commercial sources. For example, it is also available from the Ciba-Geigy Corporation under the tradename Chimassorb 944FL. In accordance with this invention the amount of this component used in the SBM polymer composition is from about 0.001 to about 1 weight percent where the weight percent is based on the weight of the SBM polymer. However, it is preferred that the amount used is from about 0.005 to about 0.5 weight percent; it is more preferred that the amount used is from about 0.01 to about 0.25 weight percent; and it is most preferred that the amount used is from 0.05 to 0.15 weight percent.

The hydrocarbyl sulfides used in this invention have one of the following formulas:

$$R^3-S-R^5-S-R^4 \text{ or } R^3-S-R^4$$

wherein $R^3$ is a $C_bH_{(2+1)}$ alkyl, where b is an integer from 1 to about 30; and wherein $R^4$ is a $C_dH_{(2d+1)}$ alkyl, where d is an integer from 1 to about 30; and wherein $R^5$ is a $C_eH_{2e}$ or a $C_eH_{(2e-2)}$ hydrocarbyl where e is an integer from about 1 to about 30. It is preferred that the hydrocarbyl sulfide contain essentially no ionic, polar, hydrophilic, or hydrolyzable groups within the molecular structure. Examples of such compounds are dimethylsulfide, diethylsulfide, dipropylsulfide, dibutylsulfide, dipentylsulfide, dihexylsulfide, diheptylsulfide, dioctylsulfide, dinonylsulfide, didecylsulfide, diundecylsulfide, didodecylsulfide, ditridecylsulfide, ditetradecylsulfide, dipentadecylsulfide, dihexadecylsulfide, diheptadecylsulfide, dioctadecylsulfide, dinonadecylsulfide, dieicosylsulfide, dihenecosylsulfide, didocosylsulfide, ditricosylsulfide, ditetracosylsulfide, dipentacosylsulfide, dihexacosylsulfide, diheptacosylsulfide, dioctacosylsulfide, dinonacosylsulfide, ditriacontylsulfide and mixtures of two or more said hydrocarbyl sulfides. Additionally, preferred compounds are dioctadecylsulfide and $C_{18}H_{37}$—S—$C_8H_{14}$—S—$C_{18}H_{37}$.

These compounds are available from commercial sources. For example, the Pennwalt Corporation produces a hydrocarbyl sulfide under the tradename Anoxsyn 442. However, these compounds can be made, for example, by reacting a dichloride, Cl—$R^5$—Cl, with the mercaptans $R^3$—SH and $R^4$—SH. The dichloride, is heated, if necessary, to the liquid phase, and the reaction can be run at that temperature. Otherwise the reaction can be run at ambient temperature. This reaction also can be run in the presence of a solvent such as benzene or toluene. As another example, a chloride $R^3$—Cl can be reacted with a mercaptan $R^4$—SH in a similar manner.

The amount of hydrocarbylsulfide used in the SBM polymer composition used in the invention is from about 0.001 to about 2 weight percent where the weight percent is based on the weight of the SBM polymer. However, it is preferred that the amount used is from about 0.01 to about 1.5 weight percent; it is more preferred that the amount used is from about 0.05 to about 1 weight percent; and it is most preferred that the amount used is from 0.1 to 0.5 weight percent.

Other additives optionally can be incorporated into the SBM polymer composition. Examples are antifogging agents, antimicrobial agents, antioxidants, colorants, coupling agents, flame retardants, foaming agents, fragrances, lubricants, mold release agents, organic peroxides, plasticizers, smoke suppressants, heat stabilizers, ultra-violet light stabilizers, fibrous reinforcements, fillers, nickel stabilizers, antistatic agents, and mixtures of two or more of these additives. Further information on these additives can be found on pages 143–220 of the Modern Plastics Encyclopedia '92, the entire disclosure of which is hereby incorporated by reference.

The SBM polymer composition of this invention can be formed by combining:
(a) a stereoregular, branched-mono-1-olefin polymer;
(b) tris(3,5-di-t-butyl-4-hydroxybenzyl)isocyanurate;
(c) poly[[6-[(1,1,3,3-tetramethylbutyl)amino]-s-triazine-2,4-diyl][(2,2,6,6-tetramethyl-4-piperidyl)imino]hexamethylene-[(2,2,6, 6-tetramethyl-4-piperidyl)imino]]; and
(d) a hydrocarbylsulfide; according to any method known in the art. For example, the components of the SBH polymer composition can be combined by dry mixing in the form of a powder or wet mixing in the form of a solution or slurry. In these types of methods, the SBM polymer can be in any form such as fluff, powder, granulate, pellet, solution, slurry, or emulsion.

The SBM polymer composition is especially useful in applications that require that a metal surface come in contact with the SBM polymer. Examples of such equipment include, but are not limited to, all types of mixing vessels, storage vessels, blenders, mixers, pelletizers, extruders, transfer tubes, screws, spinnarets, barrels, cutting blades, hoppers, dies, molds. Additionally, this SBM polymer composition is useful in such processing applications as thermoforming, injection molding, blow molding, roto molding, and spinning.

EXAMPLE

This example is provided to further assist a person skilled in the art with understanding the invention. The particular components, conditions, reactants, temperatures, and the like are also meant to be illustrative of the invention and not meant to unreasonably limit the invention.

The following components were used in this example:
(1) Polymethylpentene copolymer containing about 2.5 mole percent 1-decene. This resin is available commercially from the Mitsui Corporation under the tradename RT18;
(2) Irganox 3114 also known as tris(3,5-di-t-butyl-4-hydroxybenzyl)isocyanurate, which is available from the Ciba-Geigy Corporation;
(3) Chimassorb 944FL also known as Poly[[6-[(1,1,3,3-tetramethylbutyl)amino]-s-triazine-2,4-diyl][(2,2,6,6-tetramethyl-4-piperidyl)imino]hexamethylene-[(2,2,6,6-tetramethyl-4-piperidyl)imino]], which is available from the Ciba-Geigy Corporation;
(4) Anoxsyn 442, which is available from the Pennwalt Corporation;
(5) Cyanox 1790 also known as 1,3,5-tris(4-t-butyl-3-hydroxy-2,6-dimethylbenzyl)-1,3,5-triazine-2,4,6-(1H,3H,5H)-trione, which is available from American Cyanamid Corp.;
(6) Ethyl 330 also known as 1,3,5-tris(3,5-di-t-butyl-4-hydroxybenzyl) methylene, which is available from Ethyl Corp;
(7) Lupersol 101 also known as 2,5-dimethyl-2,5-bis(t-butylperoxy) hexane, which is available from Pennwalt Corp.;
(8) Ultranox 626 also known as bis(2,4-di-t-butylphenyl)pentaerythritol diphosphite, which is available from the General Electric Corporation; and
(9) Irgafos 168 also known as tris(2,4-di-t-butylphenyl)phosphite, which is available from the Ciba-Geigy Corporation.

Each SBM polymer composition in Table E1 was dry blended together with the indicated components in the indicated proportions and subjected to the metal corrosion test. Metal corrosion was evaluated by contacting each SBM polymer composition with a 1.25 inch diameter disk of mild carbon steel (SAE 1200). Each steel disk was prepared by washing it with an organic solvent and then sanding it lightly with 400 grit sandpaper. Each SBM polymer composition was then compression molded against a prepared disk at a pressure of about 32,600 psi (about 40,000 lbs. total force) for a 15 minute time period at a temperature of 288° C. Each SBM polymer composition/disk sample was then allowed to cool to ambient temperature before removing it from the molding press. When cooled, each SBM polymer composition was separated from its disk and that disk was placed in a desiccator at 100% relative humidity for 18±2 hours. At the completion of the test, each steel disk was removed from the desiccator and visually compared for pitting corrosion to a uniquely developed series of nine SAE 1200 mild carbon steel disks. These comparison disks systematically varied from 0 to 4 in half-steps with 0 showing no pitting corrosion and 4 showing the greatest pitting corrosion. The results are presented in Table E1.

TABLE E1

| Composition | PMP | Irganox 3114 | Ethyl 330 | Cyanox 1790 | Ultranox 626 | Irgafog 168 | Anoxsyn 442 | Chimassorb 944 | Lupersol 101 | Corrosion |
|---|---|---|---|---|---|---|---|---|---|---|
| 1 | 100 | 0 | 0 | 0 | 0 | 0 | 0 | 0 | 0 | 1.5 |
| 2 | 100 | 0.2 | 0 | 0 | 0.3 | 0 | 0 | 0.1 | 0 | 2.0 |
| 3 | 100 | 0.2 | 0 | 0 | 0.3 | 0 | 0 | 0.1 | 0.05 | 1.5 |
| 4 | 100 | 0 | 0.2 | 0 | 0.3 | 0 | 0 | 0.1 | 0 | 2.0 |
| 5 | 100 | 0 | 0.2 | 0 | 0.3 | 0 | 0 | 0.1 | 0.05 | 1.5 |
| 6 | 100 | 0 | 0 | 0.2 | 0.3 | 0 | 0 | 0.1 | 0 | 2.0 |
| 7 | 100 | 0 | 0 | 0.2 | 0.3 | 0 | 0 | 0.1 | 0.05 | 1.5 |
| 8 | 100 | 0.2 | 0 | 0 | 0 | 0.3 | 0 | 0.1 | 0 | 2.5 |
| 9 | 100 | 0.2 | 0 | 0 | 0 | 0.3 | 0 | 0.1 | 0.05 | 1.0 |
| 10 | 100 | 0 | 0.2 | 0 | 0 | 0.3 | 0 | 0.1 | 0 | 1.5 |
| 11 | 100 | 0 | 0.2 | 0 | 0 | 0.3 | 0 | 0.1 | 0.05 | 1.5 |
| 12 | 100 | 0 | 0 | 0.2 | 0 | 0.3 | 0 | 0.1 | 0 | 2.5 |
| 13 | 100 | 0 | 0 | 0.2 | 0 | 0.3 | 0 | 0 | 0.05 | 1.0 |
| 14 | 100 | 0.2 | 0 | 0 | 0 | 0 | 0.3 | 0.1 | 0.05 | 0 |
| 15 | 100 | 0 | 0.2 | 0 | 0 | 0 | 0.3 | 0.1 | 0.05 | .5 |
| 16 | 100 | 0 | 0 | 0.2 | 0 | 0 | 0.3 | 0.1 | 0.05 | .5 |

It is apparent from the above results that composition 14 was the least corrosive to the steel disk.

That which is claimed is:

1. A stereoregular, branched-mono-1-olefin polymer composition comprising:
(a) a siereoregular, branched-mono-1-olefin polymer;
(b) tris(3,5-di-t-butyl-4-hydroxybenzyl)isocyanurate;
(c) poly[[6-[(1,1,3,3-tetramethylbutyl)amino]-s-triazine-2,4-diyl] [(2,2,6,6-tetramethyl-4-piperidyl)imino]hexamethylene-[(2,2,6,6-tetramethyl-4-piperidyl)imino]]; and
(d) a hydrocarbylsulfide.

2. A composition according to claim 1 wherein said branched-mono-1-olefin has the formula:

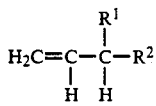

wherein $R^1$ is hydrogen or a $C_nH_{(2n+1)}$ alkyl, where n is an integer from to about 4; and wherein $R^2$ is a $C_xH_{(2x+1)}$ alkyl, where x is an integer from 1 to about 6; provided that when $R^1$ is hydrogen then $R^2$ is a branched alkyl.

3. A composition according to claim 1 wherein said branched mono-1-olefin is 3-methyl-1-butene, 3-methyl-1-pentene, -methyl-1-pentene, 3-ethyl-1-hexene, and mixtures of two or more said branched-mono-1-olefins.

4. A composition according to claim 1 wherein said branched-mono-1-olefin is 4-methyl-1-pentene.

5. A composition according to claim 1 wherein said siereoregular, branched-mono-1-olefin polymer is a copolymer.

6. A composition according to claim 5 wherein said copolymer comprises a major amount of 4-methyl-1-pentene and a minor amount of another mono-1-olefin.

7. A composition according to claim 6 wherein said minor amount of another mono-1-olefin is 1-decene.

8. A composition according to claim 1 wherein said tris(3,5-di-t-butyl-4-hydroxybenzyl)isocyanurate is present in said composition in an amount from about 0.001 to about 1 weight percent where the weight percent is based on the weight of said stereoregular, branched-mono-1-olefin.

9. A composition according to claim wherein said poly[[6-[(1,1,3,3-tetramethylbutyl)amino]-s-triazine-2,4-diyl][(2,2,6,6-tetramethyl-4-piperidyl)imino]hexamethylene-[(2,2,6,6-tetramethyl-4-piperidyl)imino]] is present in said composition in an amount from about 0 001 to about 1 weight percent where the weight percent is based on the weight of said stereoregular, branched-mono-1-olefin.

10. A composition according to claim wherein said hydrocarbylsulfide has one of the following formulas:

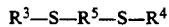     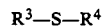

wherein $R^3$ is a $C_bH_{(2b+1)}$ alkyl, where b is an integer from 1 to about 30; and wherein $R^4$ is a $C_dH_{(2d+1)}$ alkyl, where d is an integer from 1 to about 30; and wherein $R^5$ is a $C_eH_{2e}$ or a $C_eH_{(2e-2)}$ hydrocarbyl wherein e is an integer from about 1 to about 30.

11. A composition according to claim 10 wherein $R^5$ is a $C_8H_{14}$ hydrocarbyl.

12. A composition according to claim 1 wherein said hydrocarbylsulfide is dimethylsulfide, diethylsulfide, dipropylsulfide, dibutylsulfide, dipentylsulfide, dihexylsulfide, diheptylsulfide, dioctylsulfide, dinonylsulfide, didecylsulfide, diundecylsulfide, didodecylsulfide, ditridecylsulfide, ditetradecylsulfide, dipentadecylsulfide, dihexadecylsulfide, diheptadecylsulfide, dioctadecylsulfide, dinonadecylsulfide, dieicosylsulfide, diheneicosylsulfide, didocosylsulfide, ditricosylsulfide, ditetracosylsulfide, dipentacosylsulfide, dihexacosylsulfide, diheptacosylsulfide, dioctacosylsulfide, dinonacosylsulfide, ditriacontylsulfide or mixtures of two or more said hydrocarbyl sulfides.

13. A composition according to claim 1 wherein said hydrocarbylsulfide is dioctadecylsulfide.

14. A composition according to claim 1 wherein said hydrocarbylsulfide has the formula

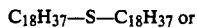

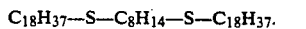

* * * * *